Nov. 3, 1970  A. H. YOUMANS  3,538,330
BOREHOLE FLUID-INFLATABLE RADIOACTIVITY
LOGGING TOOL AND METHOD
Filed Oct. 23, 1965
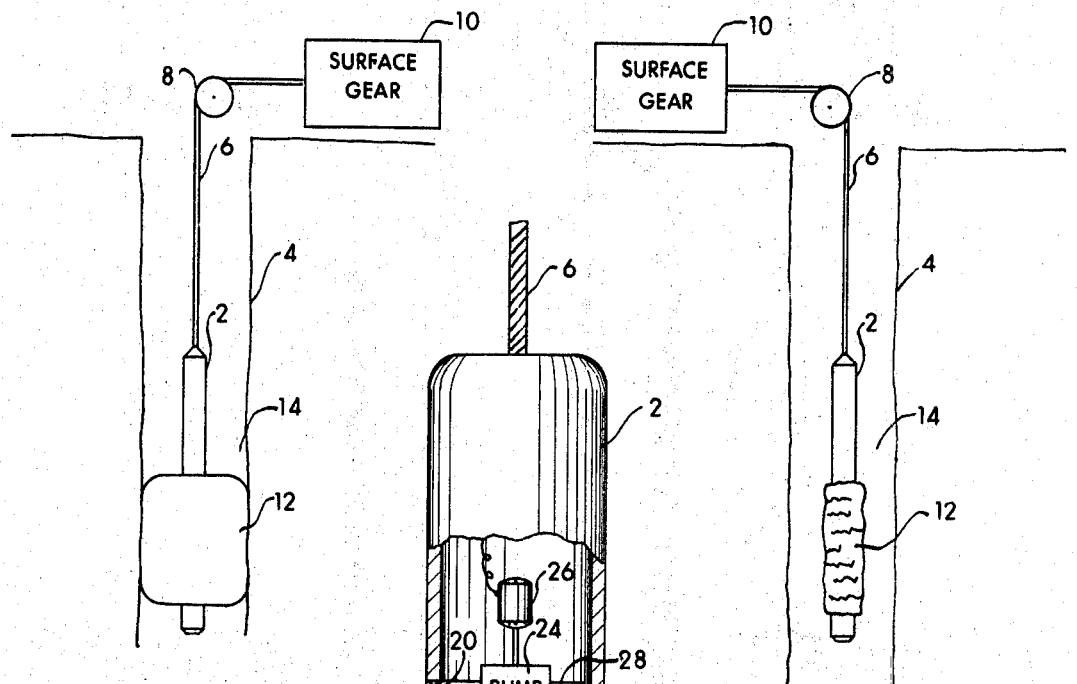
FIG. 1·B  FIG. 1·A
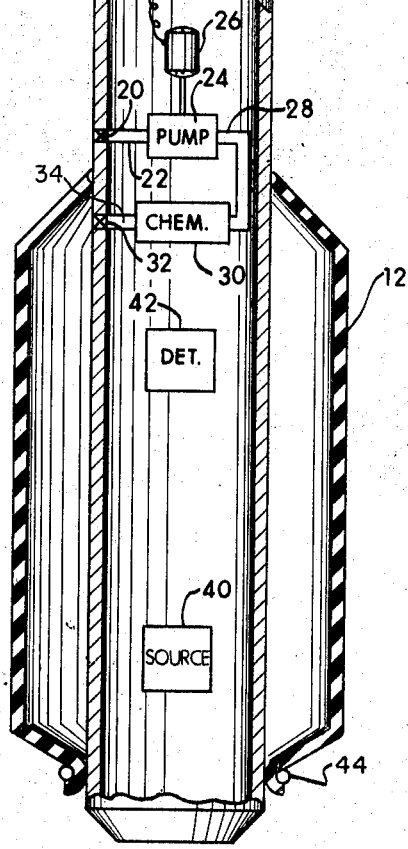
FIG. 2
INVENTOR.
ARTHUR H. YOUMANS
BY
E. F. Bard
ATTORNEY

United States Patent Office 3,538,330
Patented Nov. 3, 1970

3,538,330
BOREHOLE FLUID-INFLATABLE RADIOACTIVITY LOGGING TOOL AND METHOD
Arthur H. Youmans, Houston, Tex., assignor to Dresser Industries, Inc., Dallas, Tex., a corporation of Delaware
Filed Oct. 23, 1965, Ser. No. 503,117
Int. Cl. G01t 1/20; G01v 5/00
U.S. Cl. 250—83.6                                       3 Claims

ABSTRACT OF THE DISCLOSURE

The disclosure is of a method and apparatus for radioactivity well logging wherein an instrument with an inflatable bag about at least a portion thereof is disposed in a borehole at a pre-selected depth. Thereafter, the bag is filled with borehole fluid after such fluid is processed in a chemical cell to alter the neutron capturing power of the fluid. With the bag filled in this manner, the instrument is raised while logging the earth formations surrounding the borehole. One apparatus disclosed for carrying out this method has a chemical cell connected into a valve-controlled channel so that borehole fluid is passed through the chemical cell to fill the bag.

---

This invention relates to improved methods and apparatus for making radioactivity well logging measurements, and more particularly relates to methods and apparatus for reducing or eliminating borehole effect on such measurements.

It is well known that oil and gas is found in subsurface earth formations, and that boreholes are drilled from the surface and into these formations to obtain the oil or gas. It is also well known that the oil or gas bearing formations are identified by methods and apparatus which provide a progressive measurement of the earth along the length of the borehole. There are various types of systems now available for making these measurements. However, after a well has once been cased with steel pipe, only radioactivity logging systems can be used to measure the lithology of the earth behind the pipe.

One of the most important classes of radioactivity logs is that provided by apparatus having a source of neutrons and a radiation detector which senses either neutrons or gamma rays created by neutron bombardment. In other words, if the neutron source is positioned so as to irradiate the borehole and surrounding earth with fast neutrons, these fast neutrons will pass into the borehole and adjacent earth while engaging in one or more kinds of reaction with nuclei which they bombard. These fast neutron reactions may be elastic or inelastic scattering reactions, whereupon the bombarding neutrons tend to slow down (lose energy) until they are reduced to thermal energy. Thereafter, these thermalized neutrons are gradually captured one-by-one as they collide with nuclei of the material in the borehole and surrounding earth.

Those nuclear reactions which involve either inelastic scattering of fast neutrons, or capture of thermal neutions, produce gamma rays which are indicative in energy of the type of nuclei being bombarded. No gamma rays are produced by elastic scattering reactions, but the bombarding neutrons tend to lose energy in an amount which is related to the type of nuclei being bombarded.

Accordingly, then, the detector may be made responsive to thermal neutrons, and the resulting measurement will thereupon be a function of the relative capturing effect had by different formations upon the flux or cloud of neutrons being emitted by the source. In other words, many of the fast neutrons which are thermalized in the adjacent earth will be scattered back into the borehole and strike the detector. Obviously, then, the rate at which the detector registers or counts thermal neutrons, as the apparatus is drawn through the borehole, will be a functional indication of the relative capturing ability of the various formations traversed by the borehole.

In the case where the radiation measured is the gamma radiation produced by inelastic scattering and capture reactions, this radiation my be spectrally analyzed to provide a measurement of selected elements. On the other hand, if the detector is adapted to respond to thermal neutrons, the resulting measurement will provide an indication of the capturing power of the irradiated substances.

All boreholes are normally filled with fluid such as water, oil, drilling mud, etc., and it should be remembered that the neutron source will necessarily irradiate the fluid in the borehole as well as the surrounding earth. Thus, many of the gamma rays which are detected will have been produced by nuclei of the fluid, rather than of the surrounding earth. Moreover, where the detector is adapted to sense thermal neutrons directly, it will be apparent that many of the neutrons which are thermalized in the adjacent earth will be captured in the fluid before they can reach the detector. Accordingly, it is apparent that the fluid in the borehole exercises a deleterious effect (known as "borehole effect") on any radioactivity well logging measurement, since it is the adjacent earth, rather than the contents of the borehole, which are sought to be measured.

It is possible, of course, to pump out the borehole before performing logging operations. However, this is a relatively time-consuming and expensive operation, even when the well is not flowing. Thus, if it was not for the fact that the contents of the borehole are seldom uniform in composition throughout the length of the borehole, most logging operators would probably prefer to tolerate the effect of the fluid on their measurements.

Accordingly, techniques for reducing or eliminating borehole effect have been proposed from time-to-time. For example, in the co-pending patent application Ser. No. 435,698, which was filed June 10, 1954, by A. H. Youmans, there are disclosed methods and apparatus for pulsedly irradiating the formations with fast neutrons, and for gating a gamma ray detector for selected intervals following each fast neutron pulse, to measure the rate of decline of each thermal neutron cloud produced by each fast neutron pulse. In particular, the co-pending Youmans application teaches that the borehole fluid will capture these thermal neutrons at a faster rate than will the surrounding earth, and that the detector should therefore be gated on only after the borehole neutrons have all been captured.

The technique disclosed in the aforementioned co-pending Youmans application has been used successfully in many cases. Even so, however, it is still impossible to eliminate borehole effect in many other cases wherein the character of the fluid is not uniform throughout the length of the borehole. In other words, the borehole fluid may be relatively salty throughout most of the borehole, and salty fluid will capture thermal neutrons quite rapidly. Therefore, if a fresh water zone has been tapped, either intentionally or inadvertently, at least a limited section of the borehole may contain fluid, which is less salty and therefore which has a lesser capturing ability for thermal neutrons, than the other saltier sections of the borehole. Accordingly, a detection delay interval which is approximately correct for the salty sections of the borehole, may permit detection of many irrelevant gamma rays when the logging tool passes the less salty section.

In another case, it has been suggested in U.S. Pat. No. 3,102,956, that the logging tool might be provided with a shell or cage of material of a relatively highly capturing of absorbing material. Thus, this shell or cage would effectively displace the fluid around the logging tool, and since the shell or cake would be carried through the borehole with the logging tool, the tool would always be surrounded by the same type of material. It is obvious that a cage or shell of this type would have to be relatively large in order for it to perform as intended. However, such a shell or cage would then be difficult to drag up and down a borehole, and thus such a technique is not ordinarily practical.

These disadvantages of the prior art are overcome with the present invention, and novel methods and apparatus are herein proposed for reducing or substantially eliminating borehole effect for most radioactivity well logging techniques, without the necessity of pumping out the borehole, and without limiting or effectively reducing the mobility of the tool in the borehole.

Accordingly, it is an object of the present invention to provide novel methods and apparatus for overcoming borehole effect on radioactivity well logging measurements.

It is also an object of the present invention to provide novel methods and apparatus for controlling the borehole environment of the logging tool so as to overcome borehole effect on a radioactivity well logging measurement.

It is further an object of the present invention to provide novel methods and apparatus for establishing a uniform borehole environment for the logging tool, at all depths in the borehole, and at different occasions.

It is a specific object of the present invention to provide a novel method of radioactivity well logging with a system including a subsurface instrument having a flexible bag disposed fluid-tightly about its sensing section, said method comprising disposing said instrument and bag in a borehole at a preselected depth while said bag is in an empty condition, thereafter filling said bag with a preselected material so as to cause said filled bag to displace all fluid in the portion of the borehole surrounding the sensing section of said instrument, and thereafter raising said instrument and filled bag to the surface of the earth while logging the earth substances surrounding said borehole.

It is also a specific object of the present invention to provide novel radioactivity well logging apparatus including a subsurface instrument, surface-located control equipment, and a logging cable interconnecting said control equipment and said subsurface instrument, said apparatus further comprising a flexible bag means fluid-tightly mounted on the exterior of and about the sensing section of said instrument, filling means in said instrument for filling said bag with a preselected material having a neutron capturing power different from that of the earth surrounding the well, and means interconnected with said logging cable and surface-located control means for actuating said means for filling said bag.

These and other objects and features of the present invention will be apparent from the following detailed description wherein reference is made to the figures of the accompanying drawing.

In the drawing:

FIG. 1-A is a pictorial view, partly in cross section, of a conventional well logging system, wherein the subsurface instrument has been provided with a bag about its sensing section, and wherein the bag is shown in its collapsed or empty state while the instrument is being lowered into the borehole.

FIG. 1-B is another similar pictorial view of the apparatus depicted in FIG. 1-A, wherein the bag has been filled, and wherein the system is now conditioned for logging operations in the borehole.

FIG. 2 is a functional representation of one form of the present invention, including a functional representation of one form of apparatus for filling the bag depicted in FIGS. 1-A and 1-B.

The present invention is preferably performed by equipping the logging tool with a pumping system and reservoir of a soluble material such as a compound of boron, and an externally-mounted bag. The bag is preferably held in a collapsed or empty condition, when the logging tool is inserted into the borehole at the surface, so that the bag will not substantially impede the downward travel of the logging tool. However, after the tool reaches the bottom of the borehole, the pumping system can be remotely actuated from the surface so as to pump fluid from the borehole into the bag.

The bag is necessarily positioned so as to surround the detector and, perhaps, the neutron source. Furthermore, the bag is preferably of a size such as to fill or substantially fill the section of the borehole surrounding the detector and the source. Thus, as the tool is drawn up through the borehole, the tool will be constantly surrounded by the same type of fluid at all depths. Furthermore, since the bag is yieldable to its confines, it will yield to protuberances or sharp deflections in the borehole and will have relatively little tendency to cause the tool to jam in the borehole.

The present invention will, of course, obtain its intended purposes when the fluid in the bag is unchanged from the condition it was in when it was taken from the borehole. However, it is often desirable to include a reservoir in the tool which contains a material having a relatively high thermal neutron capture cross section. Thus, when the pumping system fills the bag with borehole fluid, it can be adapted to also inject this high capture material into the trapped fluid. Alternatively, the pumping system may be adapted to pump borehole fluid through the reservoir, before pumping it into the bag, in order that the fluid can carry the capturing material out of the reservoir and into the bag.

Referring now to FIG. 1-A, there may be seen a simple pictorial representation of a well logging tool 2 suspended in a borehole 4 by means of a logging cable 6. The logging cable 6 is shown as passing over a conventional sheave wheel 8 to connect with the usual surface gear 10 which includes hoist, subsurface control and power circuits, and detector signal processing and recording equipment.

As may also be seen, the logging tool 2, which may be any type of radioactivity logging instrument, has a fluid-tight bag 12 disposed in a collapsed or empty condition about its sensitive area or section. It is ordinarily not practical to attempt to "stuff" a logging tool down a borehole. Thus, it is the weight of the tool and cable which must be depended upon to carry any tool into a borehole. As depicted in FIG. 1-A, the collapsed bag 12 may be somewhat larger in cross sectional area than the tool 2. However, it will be apparent that the bag 12 will have little or no tendency to prevent the tool 2 from being freely lowered to the bottom of the borehole 4 when the bag 12 is maintained in its empty or collapsed condition as depicted in FIG. 1-A.

Referring now to FIG. 1-B, there may be seen the logging tool 2 with its bag 12 in its distended condition after being filled with fluid 14 from the bottom or other preselected level of the borehole 4. As depicted, the filled bag 12 surrounds the sensing section of the tool 2, and fills or substantially fills the surrounding section of the borehole 4. Accordingly, the tool 2 may now be raised to the surface of the earth while measuring the lithologic character of adjacent earth formation. At all depths, however, the sensing section of the borehole will be surrounded by the same type of fluid 14, and thus the resulting measurement will not be affected in the event the fluid 14 changes in composition at different sections of the borehole. Moreover, if abrupt shifts in borehole direction are encountered, or if cross sectional irregularities such as protuberances are encountered (in an uncased borehole), the bag 12 will not impede tool 2 mobility.

Referring now to FIG. 2, there may be seen a simple functional representation of the tool 2, the bag 12, and certain components for filling the bag 12 with fluid 14 from the borehole 4. In particular, there is provided a spring-loaded check valve 20 which is adapted to open a first channel 22 connecting the intake port of a pump 24 to the fluid 14 in the borehole 4. The pump 24, which is actuated by an electric motor 26, has its outlet port connected via a second channel 28 to a chemical cell 30. The check valve 20 may be adapted to be normally-closed so as to prevent fluid 14 from entering the first channel 22 except when the pump 24 is actuated. The motor 26 is remotely controlled and powered by any suitable control and power circuitry from the surface of the earth.

The chemical cell 30 preferably contains a filter, an emulsifying agent, and a soluble compound of boron, lithium, cadmium, chlorine, gadolinium, or some other element having a high thermal neutron capture cross section. If the fluid 14 in the borehole 4 is composed of fresh or salty water, or the like, then the compound chosen must be water-soluble. On the other hand, if the fluid 14 is oil or the like, then the selected compound must necessarily be oil-soluble. The emulsifying agent is only necessary when the fluid 14 is not all water, or all oil, at the depth at which the bag 12 is to be filled, and thus the compound cannot be made completely soluble.

The outlet of the chemical cell 30 is connected to a second check valve 32 by way of a third channel 34. The second check valve 32, which opens into the interior of the bag 12, is also spring-loaded and normally-closed.

As may be seen in FIG. 2, the sensing section of the tool 2 which contains the neutron source 40 and radiation detector 42 is encompassed by a bag 12 which is preferably fashioned of a flexible material such as leather or rubber. The bag 12 is preferably fixedly secured to the tool 2 at its upper end, and detachably secured to the tool 2 at its lower end by a spring-type clamping ring 44, so that the bag 12 can easily be emptied after the tool 2 has been lifted out of the borehole 4.

As hereinbefore explained, the bag 12 is maintained in its empty or collapsed condition while the tool 2 is lowered into the borehole 4. After the tool 2 has reached the bottom (or any other selected depth) in the borehole 4, the electric motor 26 is remotely actuated to activate the pump 24. The suction provided by the pump 24 functions to open the first check valve 20, and to draw fluid 14 in through the first channel 22, the pump 24, the second channel 28, and through the chemical cell 30 to the third channel 34 and second check valve 32. The fluid (not depicted) in the chemical cell 30 functions to keep solid debris from clogging or damaging the chemical cell 30.

As the fluid 14 passes through the chemical cell 30, it dissolves and carries with it the compound composed of the preselected element or elements having a high thermal neutron capture cross section. Thus, the fluid 14 which enters the interior of the bag 12 by way of the second check valve 32, will have a far greater capturing power for thermal neutrons than will the fluid 14 which is outside of the bag 12.

As has hereinbefore been explained, the untreated fluid 14 in the borehole 4 will normally have a greater capturing power for thermal neutrons than will any of the surrounding earth formations. However, it is desirable to provide that the amount of capturing compound in the chemical cell 30, which is dissolved by the fluid 14 inside the bag 12, is sufficient to make the bag 12 and its contents substantially so slow as well as thermal neutrons, and thus to mask the presence of chlorine or any other capturing material which may be in the fluid 14 in the borehole. Thus, if the fluid 14 is normally 10% sodium chloride by weight, adding an equal weight of sodium borate to the fluid 14 in the bag 12 will cause substantially 95% of the neutron capture reactions to occur with boron nuclei instead of the chlorine nuclei. Where the fluid 14 in the borehole 4 is oil or the like, the compound could be methyl borate instead of sodium borate. Compounds such as lithium citrate or lithium hydroxide can be used instead of sodium borate.

As depicted in the figures of the accompanying drawings, the tool 2 may be centralized in the borehole 4. Thus, the logging measurements obtained with apparatus of this type and design will have a good repeatability. If necessary or desirable, however, the bag 12 can be asymmetrically mounted on the tool 2, so that the tool 2 is positioned close to the borehole 4 wall, and so that the bag 12 will nevertheless function to substantially displace all the fluid 14 in the borehole 4, around the tool 2, with a body of fluid 14 having a known, constant capturing ability for neutrons.

It should be realized that there are many occasions where it is desirable to re-log a borehole which has previously been logged. If the borehole is receiving fluid from a flowing formation, it is often the case that the fluid content of the borehole will have a neutron capturing power which is significantly different from what it had when the borehole was previously logged. Thus, it is extremely desirable to provide the chemical cell 30 with a capturing material which will completely overwhelm the capturing power of the mineral, in the borehole fluid 14. In this manner, the effect had by the fluid 14 in the bag 12 on both logging measurements, will be the same irrespective of any change which may have occurred, in the chemical composition of the fluid 14 during the period between the two logging operations.

Notwithstanding the fact that most boreholes are normally filled with fluids, it is sometimes the case that a borehole will be encountered which is relatively empty—especially in the case of gas-producing wells. In such a case, it may be desirable to replace the motor 26, pump 24, chemical cell 30, and channels 20 and 28, with a pressurized bottle or container filled with a gas such as boron trifluoride, helium-3, or the like, which has a relatively high thermal neutron capture cross section. The gas bottle, which may be connected to channel 34 by way of a solenoid-actuated valve, can thus be used to inflate the bag 12 with a high capture gas which will function in the manner hereinbefore described with respect to the borehole fluid 14.

Another alternative form of the present invention may be found in the use of an ion-exchange resin, or the like, in the chemical cell 30 instead of a soluble high capture material such as sodium borate. In this case, the ion-exchange material will function to remove the mineral content of the fluid entering the bag 12, and thus the bag 12 will be filled with substantially pure water instead of fluid having an overwhelmingly high thermal neutron capture cross section.

Numerous other variations and modifications may obviously be made in the structures, methods, and techniques herein described, without departing from the essence of the present invention. Accordingly, it should be clearly understood that the forms of the invention described herein and shown in the figures of the accompanying drawings, are illustrative only, and are not intended to limit the scope of the invention.

What is claimed is:

1. A method of radioactivity well logging with a system including a subsurface instrument having a flexible bag disposed fluid-tightly about its sensing sections, said method comprising:
    disposing said instrument and bag in a borehole at a pre-selected depth while said bag is in an empty condition,
    thereafter filling said bag with a pre-selected material made up of borehole fluid so that the neutron capturing power of fluid in said bag is unaltered while transversing the borehole so as to cause said filled bag to displace a substantial portion of the fluid in the portion of the borehole surrounding the sensing section of sadi instrument, and
    thereafter raising said instrument and filled bag to the surface of the earth while logging the earth substances surrounding said borehole, wherein said material filling said bag has a predeterminde neutron capturing power substantially greater than the capturing power of the earth substances surrounding the borehole.

2. A Radioactivity well logging apparatus including a subsurface instrument, surface-located control equipment, and a logging cable interconnecting said control equipment and said subsurface instrument, said apparatus further comprising:
- a flexible bag means fluid-tightly mounted on the exterior of and about the sensing section of said instrument,
- filling means in said instrument for filling said bag with a pre-selected fluid having a neutron capturing power different from that of the earth surrounding the well,
- said filling means including a chemical cell and valve-controlled channel means to pass borehole fluid to said chemical cell to alter the borehole fluid to produce said pre-selected fluid and valve-controlled channel means to pass said pre-selected fluid to said bag, and
- means interconnected with said logging cable and surface located control means for actuating said means for filling said bag.

3. The apparatus described in claim 2, wherein said preselected fluid has a neutron capturing power substantially greater than the fluid in a fluid-containing borehole containing said subsurface instrument.

References Cited

UNITED STATES PATENTS

| | | | |
|---|---|---|---|
| 3,066,739 | 12/1962 | Saurenman et al. | 166—187 |
| 3,130,787 | 4/1964 | Manson | 166—187 |

ARCHIE R. BORCHELT, Primary Examinre

M. J. FROME, Assistant Examiner

U.S. Cl. X.R.

250—83.1, 108; 166—187